Feb. 19, 1952
J. J. PLESKAC
2,586,255
CULTIVATOR SHOVEL
Filed April 12, 1948
2 SHEETS—SHEET 1
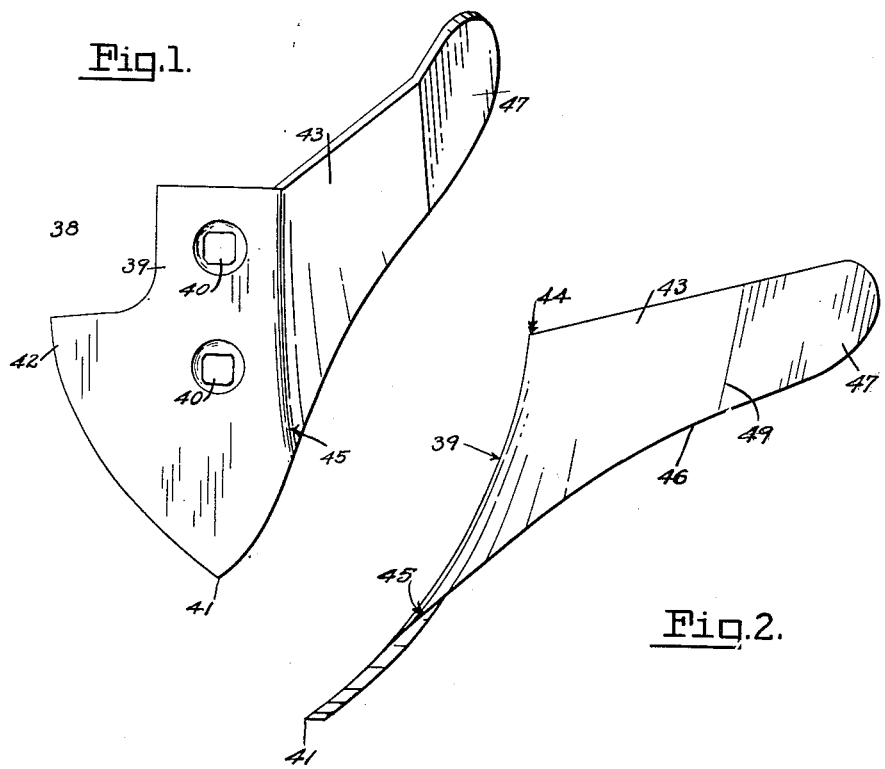
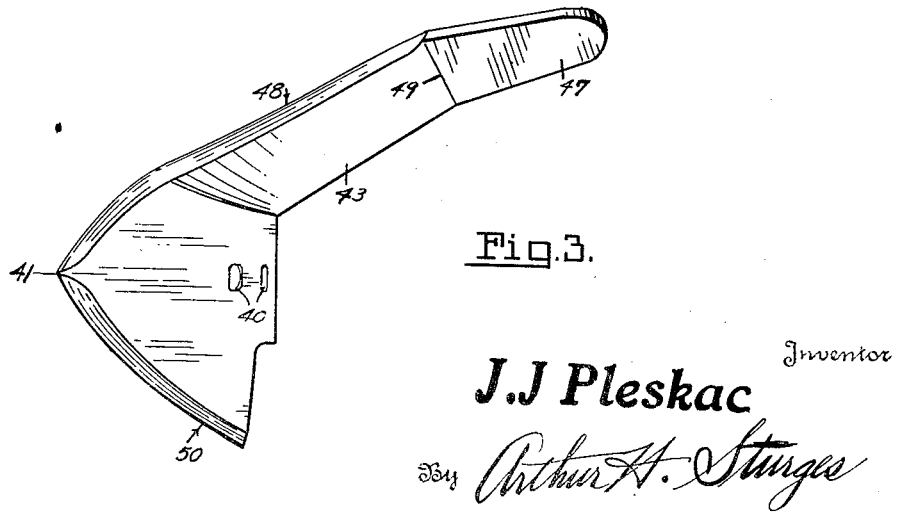
J. J. Pleskac, Inventor
By Arthur H. Sturges, Attorney Feb. 19, 1952    J. J. PLESKAC    2,586,255
CULTIVATOR SHOVEL Filed April 12, 1948    2 SHEETS—SHEET 2

J.J Pleskac Inventor

By *Arthur H. Sturges*

Attorney

Patented Feb. 19, 1952

2,586,255

UNITED STATES PATENT OFFICE 2,586,255

CULTIVATOR SHOVEL

John J. Pleskac, Ulysses, Nebr.

Application April 12, 1948, Serial No. 20,392

1 Claim. (Cl. 97—204)

The present invention relates to agricultural implements and more particularly to the art of cultivating the soil.

It is an object of the invention to provide a cultivator shovel which is so shaped that at times when it is cooperatively assembled for use with certain portions of a self-propelled cultivator and used for treating corn hills that the said assemblage of parts eradicates weeds more advantageously than heretofore.

Another object of the invention is to provide a device for the above described purpose which in use causes soil to be moved into alignment with a row of corn stalks and from the sides of a corn hill for treating portions of the soil in a more thorough and advantageous manner than heretofore.

A further object of the invention is to provide a device for the above stated purposes which causes the soil to become mulched during a movement thereof toward and upon the crown of a corn hill.

A still further object of the invention is to provide a device which may be employed for cultivating a field of corn in an appreciably less amount of time than heretofore required, whereby labor costs are minimized.

As heretofore practiced in the art of cultivating growing corn it has been impossible to cause loose earth to become deposited upon the crown of a corn hill and by means of conventional cultivating machinery since the aligned corn stalks of a row of corn stalks are positioned on said crown and the present invention aims to obviate the undesirable factors of the prior practice by providing a device which causes the earth to be deposited upon said crown for smothering and killing weed growths which otherwise would sap the moisture away from the roots of the corn stalks of a row whereby said stalks would not be in as healthy a condition as the condition achieved by an employment of the present invention.

In the drawings:

Figure 1 is a front view of the new cultivator shovel.

Figure 2 is a side view thereof.

Figure 3 is a bottom plan view of the shovel shown in Figures 1 and 2.

Figure 4:
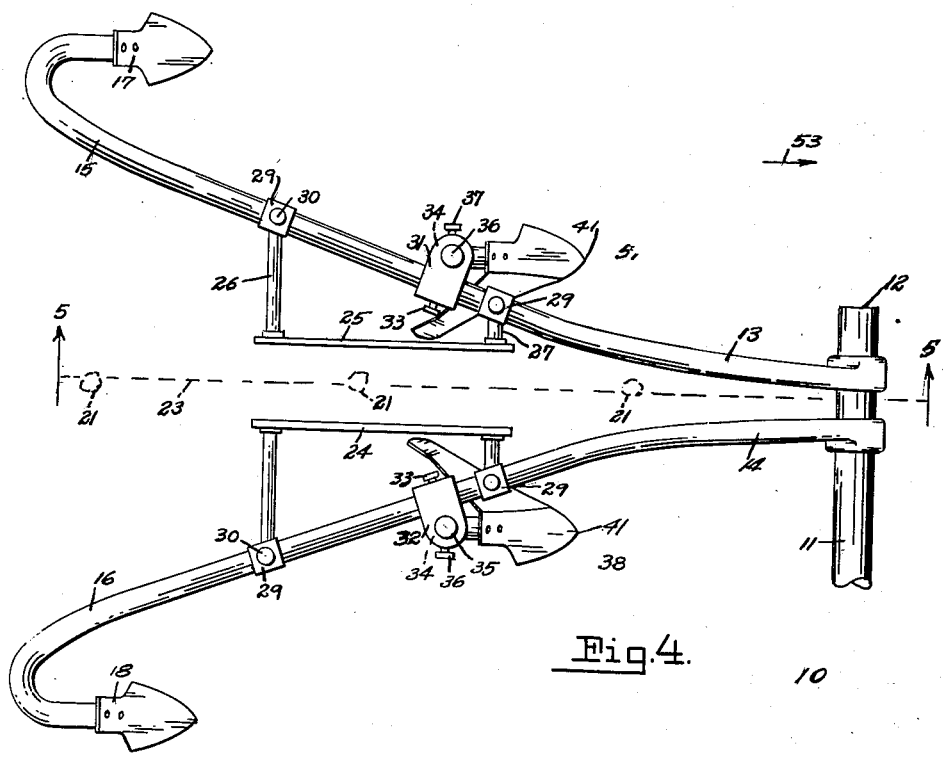
Figure 4 is a top plan view on a cultivator assembly and depicting an employment of the instant invention.

Referring now to the drawing for a more particular description and first to Figure 4, 10 generally indicates a tractor having a bar 11 disposed transversely across the forward end of the tractor. It will be understood that the bar 11 extends outwardly beyond each side of the tractor and that the later described instrumentalities are attached to each end of the bar for cultivating two rows or corn simultaneously and that since the mechanism at each end of the bar 11 is alike but one set of mechanism is minutely described herein.

The bar 11 is secured or attached to the frame of the tractor by any suitable means not shown.

Figure 5:
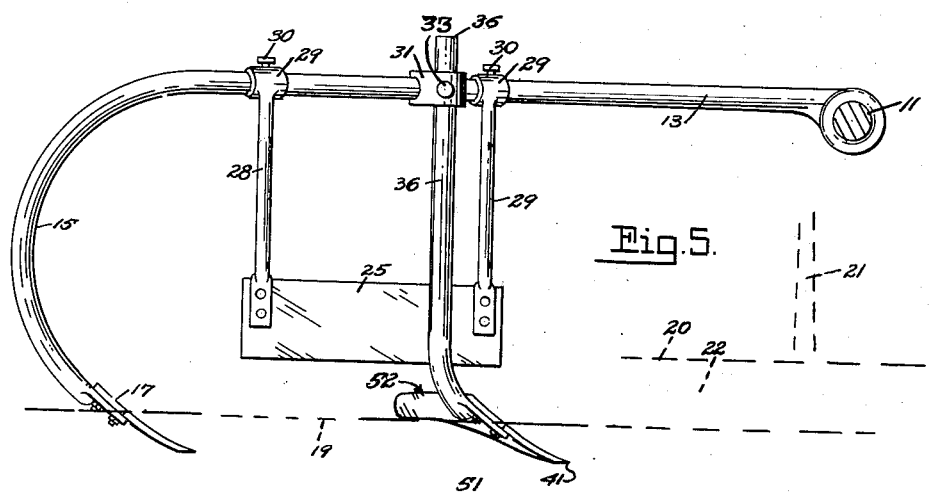
Figure 5 is a longitudinal section taken on line 5—5 of Figure 4, and showing a portion of the new device in side elevation.

To the end 12 of the bar 11 two oppositely disposed beams 13 and 14 are secured by any suitable means such as or similar to the means shown in Figure 4. As best shown in Figure 5 rear ends of the members 13 and 14 are arcuate the hook-shaped portions thereof being indicated at 15 and 16, the free end portions of said hooks being disposed downwardly towards the soil and each being provided with a conventional cultivator shovel, said shovels being indicated at 17 and 18.

In Figure 5 the dotted line 19 represents the surface of the soil and the dotted line 20 represents the crown of a corn hill. In Figure 4 spaced-apart vertically disposed corn stalks are represented by the dotted lines 21, said stalks being disposed in a row upon the crown 20 of the hill 22 as diagrammatically represented in Figure 5.

As best shown in Figure 4 the rearwardly disposed or free ends of the beams 13 and 14 extend divergently with respect to each other and to each side of their point of attachment to the bar 11 and since the free ends of the hook-shaped portions of said beams are disposed an appreciable distance away from the row of corn stalks conventional cultivator shovels are employed for engagement with the soil at the ends of said hooks.

The said row of corn stalks is represented by the dotted line 23 and at each side of said row, and in parallelism therewith like guards or shields 24 and 25 are disposed in spaced-apart relation with respect to each other, the distance between said shields being approximately eight inches during use. The shields are carried or supported by the beams 14 and 13 respectively and by means of hanger bars two of the latter being employed for each shield. The hanger bars 26 and 27 extend from the beam 13 as best shown in Figure 4 and the like hanger bars 28 and 29 depend from the beam 13. The upper ends of the hanger bars are each provided with like sockets 29 which are slidably disposed on their respective beams and may be locked in a selected position by manipulation of the set screws 30. The lower ends of the hanger bars are riveted or otherwise suitably secured to the shields and since the beams are divergently disposed with respect to each other it will be seen that by adjusting the sockets longitudinally with respect to the beams that the shields 24 and 25 may be positioned closer together or further away from the corn row 23 as may be desired for later described purposes.

Similar sockets 31 and 32 are slidably disposed on the beams 13 and 14 respectively and said sockets are adapted to be locked to their respective beams by a manipulation of the set screws 33 the latter being best shown in Figure 4.

The sockets 31 and 32 are provided with like apertures 34 for snugly receiving therein the hanger shafts 36 and 35 respectively. The said hanger shafts are slidable with respect to the sockets and in vertical directions being adapted to be maintained in a selected position above the soil by means of the further set screws 37 employed.

At the lower ends of the hanger shafts 35 and 36 the latter are provided with the new cooperative cultivator shovels now to be described.

Referring to Figure 1 the new shovel is generally indicated at 38 having an elongated flat upper face portion 39 which is approximately vertically disposed in use. The face portion is provided with a plurality of bolt receiving apertures 40 for facilitating an attachment of the shovel 38 to the lower end of the hanger shaft 35 in a manner whereby the face 39 of the shovel is transversely disposed with respect to the line of draft or forward movement of a cultivator during a cultivating operation.

The lower V-shaped end portion of the face 39 terminates in a comparatively sharp point 41, said point being in approximate vertical alignment with the apertures 40. A portion of the face, providing an outer wall indicated at 42, extends outwardly away from the main body portion of the face 39 as best shown in Figure 1.

In the practice of the present invention a wing 43 is provided for the new shovel said wing being disposed at an angle of inclination of approximately thirty degrees with respect to an inner wall or face being adjoined to the latter at the opposite side of the point of the V with respect to the portion 42.

As shown in Figure 2 the face portion of the new shovel is arcuate and concave in side elevation and said wing extends from the upper edge 44 of the flat upper section of said face downwardly towards the point 41 of the V-shaped lower section and approximately two-thirds of the length of said face, the point of junction of said face and the lower portion of the soil deflecting section of said wing being indicated at 45. As best shown in Figure 2 from the point 45 the lower edge 46 of the wing extends away from the face 39 of the new shovel and as best shown in Figures 1 and 3 the wing 43 terminates in a portion 47 which is offset with respect to the main body portion of the wing as best shown in Figure 1, said offset portion 47 being disposed at a more acute angle of inclination with respect to the face 39 than the main body portion of said wing for purposes later described and it will be understood that the terminal end portion 47 of the wing is preferably employed for the said later described purposes.

The lower edge of the portion 47 is not sharp preferably. The lower edge 46 of the main body portion 43 of the wing, as best shown in Figure 3, is provided with a comparatively sharp edge or cutter portion 48 which extends from the point or junction 49 of the terminal end portion 47 with the main body portion of said wing to the pointed end 41 of the new shovel. Also, as best shown in Figure 3, the lower end of the shovel is provided with a similar cutter 50 which extends from the point 41 along the lower edge of the portion 42 of the face of the new shovel.

As best shown in Figure 4 a similar shovel, generally indicated at 51, is oppositely disposed, in use, with respect to the above specifically described shovel 38. The shovel 51 is attached to the lower end of the hanger bar 36. The wing portion of the shovel 51 is disposed toward the shovel 38 and wing portion of the latter is disposed toward the shovel 51 and it will be understood that said shovels cooperate together, in use, being alike in all respects except that one may be called a right-hand shovel and the other a left-hand shovel said right and left referring to the opposite sides of a row of corn stalks.

As best shown in Figure 5 the upper edge 52 of the wing portion of the shovel 51 is disposed closer to the surface 19 of the soil than the lower edge of the horizontally disposed shield or guard plate 25 and it will be understood that the upper edge of the shovel 38 is similarly disposed, in use, with respect to the guard plate 24. During operation and assuming that the tractor is moving in the direction of the arrow 53 and that the lower end portions of the shovels 38 and 51 are engaged in the soil beneath the surface 19 thereof, as shown in Figure 5, it will be seen that a large portion of the earth turned by said shovels becomes moved by the oppositely disposed wings of the shovels toward and upon the crown of the corn hill heretofore mentioned for burying weed growths thereunder and that said moved soil becomes mulched to a desirable extent during said movement since it is forced under the lower edges of the guard plates 24 and 25 respectively, said plates preventing large clods of earth from becoming in contact with the growing and tender corn stalks for preventing damage to said stalks.

Among other advantages of the invention and combination of parts shown in Figure 4 it is believed pertinent to mention that the guard plates 24 and 25 prevent the soil from beating against the corn stalks said soil being moved toward said stalks by said wings. A further advantage of the arrangement of parts is that in the event that the roots of the corn stalks are long enough to protrude through the sides of the corn hill and become caught in the forward lower portion of the face plate portions of the shovels the guard plates 24 and 25 cooperate with the wings to cover the said roots with soil which, it has been found in actual practice, is a distinct advantage with respect to a cultivation of corn with conventional shovels which often permit said roots to become exposed to the air and rays of the sun whereby corn stalks are not of healthy growth.

From the foregoing description, it is thought to be obvious that a cultivator shovel assembly constructed in accordance with my invention is particularly well adapted for use by reason of the convenience and facility with which it may be assembled and operated, and it will also be obvious that my invention is susceptible of some change and modification without departing from the principles and spirit thereof and for this reason, I do not wish to be understood as limiting myself to the precise arrangement and formation of the several parts herein shown in carrying out my invention in practice, except as claimed.

I claim:

In a cultivator shovel, the combination which comprises an arcuate front plate concave in elevation, having a flat upper section and a V-shaped lower section with the wall forming one side of the V extended outwardly away from hills of a row of corn on which the cultivator from which the shovel depends is positioned providing an outer wall and the other side extended inwardly toward hills in said row of corn providing an inner wall, the outer wall of the said lower section extended beyond the edge of the corresponding side of the said flat upper section and the upper end of said outer wall being spaced from and positioned below the upper end of the said flat upper section, the inner wall of the said V-shaped lower section extended rearwardly and outwardly from the center of the shovel to a point corresponding with the edge of said flat upper section of the shovel and from said point inwardly away from the center of the shovel to provide a soil deflecting wing, and from said wing rearwardly at an acute angle in relation to the said wing, the side walls of the said V-shaped lower section of the shovel having arcuate lower edges extended upwardly and rearwardly from the point, and the said wing having an arcuate upwardly sloping lower edge positioned to pile soil elevated by the point of the shovel around hills of corn of the said row of corn.

JOHN J. PLESKAC.

REFERENCES CITED

The following references are of record in the file of this patent:

UNITED STATES PATENTS

| Number | Name | Date |
| --- | --- | --- |
| 422,718 | Cameron | Mar. 4, 1890 |
| 482,226 | Cheney et al. | Sept. 6, 1892 |
| 769,055 | Bumgardner | Aug. 30, 1904 |
| 1,870,105 | Dugger | Aug. 2, 1932 |